United States Patent Office 2,955,321
Patented Oct. 11, 1960

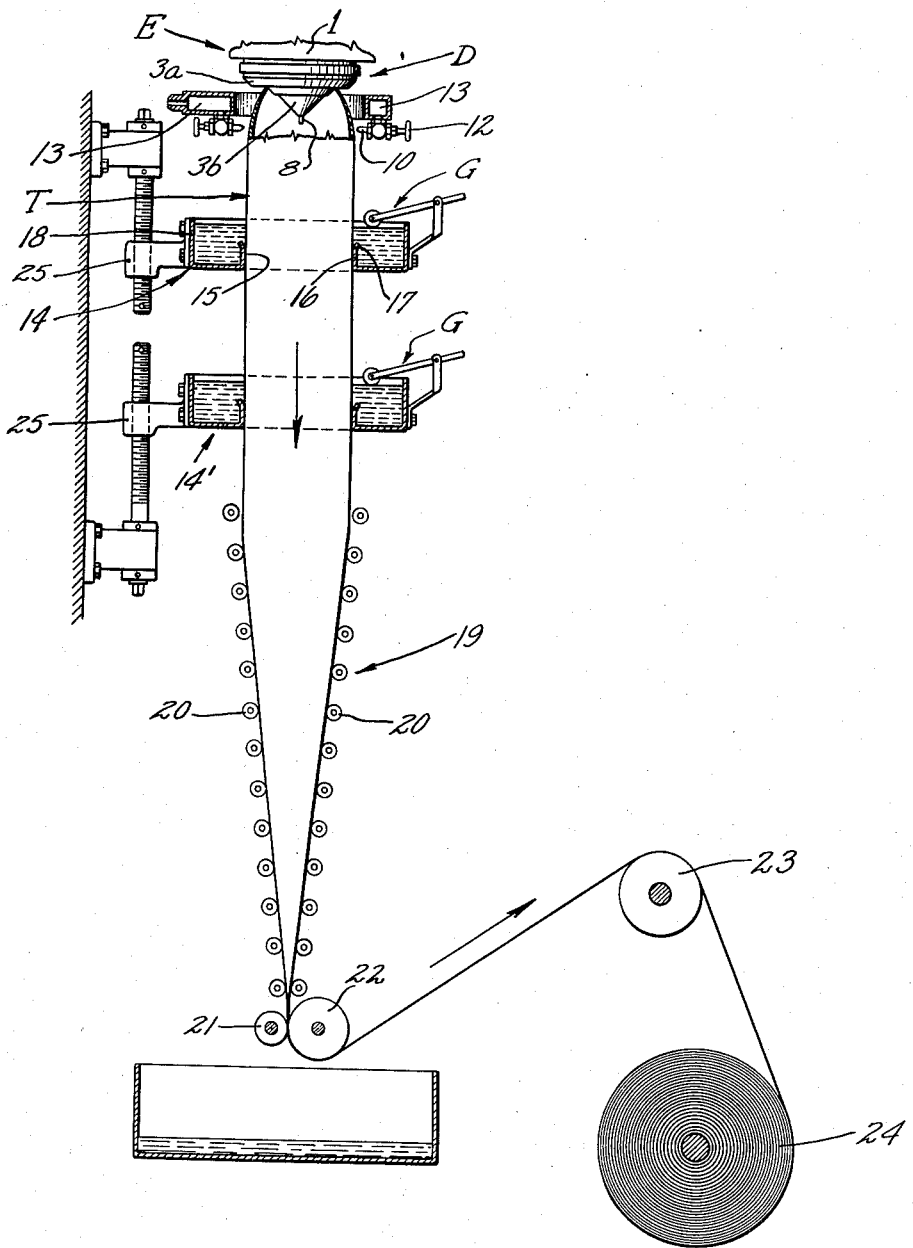

2,955,321

PROCESS AND APPARATUS FOR MANUFACTURING POLYETHYLENE TUBING

Cecil Paul Fortner, Bloomfield, and Clarence G. Reber, Mystic, Conn., assignors to Plax Corporation, Bloomfield, Conn., a corporation of Delaware Filed Nov. 9, 1956, Ser. No. 621,453

2 Claims. (Cl. 18—14)

The present invention relates to the manufacture of tubing and more particularly to novel method and apparatus for producing tubing of uniform size and shape by the extrusion of thermoplastic materials, such as polyethylene and the like.

At temperatures above their softening or transition temperature points, these materials are readily deformable and may be extruded in desired shapes and forms. Cooling establishes or sets these materials in the shapes which they had in passing through their transition points.

There is a large demand in the packaging and related fields for flexible plastic tubing having a wall thickness of a few thousandths of an inch and in widths, when collapsed, ranging from a few inches to several feet. Considerable difficulty has been experienced in the past in supplying this demand and, in particular, in satisfying the close tolerance requirements which include holding to uniform thickness and to uniform collapsed width.

In the manufacture of such tubing by the solvent-free extrusion of a heat softened thermoplastic, it is desirable to maintain air pressure within the tubing to prevent collapse and internal sticking and also to expand the tubing to a desired size within a permissive range using the same extrusion nozzle.

In the extrusion of thermoplastic tubing, considerable difficulty has been experienced where the wall of the extruded tube is insufficient in thickness at the necessarily high extrusion temperatures to prevent collapse during the course of manufacture. In order to overcome the tendency to collapse, it has been found desirable to maintain the interior of the extruded tube under pressure, as by means of a fluid medium such as air, until the thermoplastic tube has been reduced sufficiently below its extrusion temperature to attain the shape-retaining rigidity or strength inherent in such materials at lower temperatures.

Heretofore various methods and equipment have been proposed and used to extrude and blow tubing and particularly improved method and apparatus for sizing blown tubing.

It is an object of the present invention to provide improved process and apparatus for the manufacture of plastic tubing and particularly improved method and apparatus for sizing blown tubing.

Other objects and advantages will be apparent to those skilled in the art from the following detailed description of an embodiment of the invention.

The process of the invention in general comprises extruding a hot thin wall thermoplastic tubing, controlling the temperature of the extruded tubing, expanding by fluid pressure the portion of the tubing thus controlled as to temperature, cooling, sizing and setting the expanded tubing by engagement with a liquid cooling and sizing ring and collapsing the tubing to a substantially wrinkle-free collapsed condition.

The invention accordingly includes the above-mentioned several steps and the relation of one or more of those steps to each of the others, as well as the apparatus for performing the steps in proper relationship substantially as exemplified in the apparatus and its mode of operation hereinafter disclosed and claimed.

For a more detailed description of the invention, reference is made to the attached drawing which is an elevation view partly in cross section of apparatus for producing tubing in accordance with the invention.

Referring to the drawing, the illustrated embodiment of the present invention includes a tubing die D from which a thin wall tubing may be continuously extruded. A suitable extruder mechanism including heating, homogenizing, and pressure producing parts or components are, of course, provided for forcing a solvent-free plastic through the die D under optimum extrusion conditions of temperature, pressure and homogeneity. The die D is secured to the outlet end 1 of an extruder E which is fragmentarily shown.

The die D includes an inlet for receiving the heated plastic from the extruder outlet 1 and a composite annular extrusion orifice or nozzle including an outer annular member 3a and inner circular member 3b from between which the plastic is extruded in the form of tubing T. The outer member 3a is coaxially adjusted relative to the inner member 3b.

The die D also may include heating elements for controlling the temperature of the plastic therein and pressure outlet 8 through which a suitable fluid as, for example, air is introduced to maintain a desired pressure within the tubing T.

Upon leaving the die D the extruded tubing T is air cooled as it passes through a ring or circle of fishtail, gas-burner type, jets 10. Manually operated needle valves 12 individually control a supply of cooling air to the jets 10 from a circular manifold 13 connected with a compressed air supply.

While for clarity of illustration only two of the jets 10 are illustrated in the drawing, in actual practice, a much larger number, as for example 20, are provided at equally spaced intervals about the manifold ring 13. The air from the jets 10 reduces the temperature and, consequently, the plasticity of the extruded tubing.

Differential regulation of the several jets serves to control uniformly of thickness of the blown tubing. Thus, when the tubing is blowing up unevenly and a thin streak develops, a little more air from the jet 10 overlying this particular streak gives additional chilling to that portion of the tubing. The additional chilling reduces expansion and thinning of the underlying portion of the tube and greater uniformity of thickness is obtained.

In accordance with the present invention, the tubing T passes downwardly through a tank 14 containing water or other suitable cooling liquid. As shown in the drawing, the bottom of the tank 14 is provided with a circular opening 15 of the size to which the tubing T is to be blown and includes an upwardly extending cylindrical flange or inner wall 16, the upper edge of which is flared as at 17 to more readily receive the tubing T. Outer wall 18 of the tank 14 is higher than the inner wall 16 so that as shown in the drawing the water level in the tank may be maintained above the top of the inner wall 16 by the tubing T.

Preferably, a float or similar gage G is provided for sensing the level of the liquid in the tank 14 and for automatically introducing additional blowing air incrementally into the tubing T through inlet 8 and additional water into the tank until the tubing T is expanded sufficiently to maintain the liquid level above the top of the inner sleeve 16.

In addition to liquid cooling and sizing, the tubing T before the tubing contacts the sizer sleeve 16, the liquid in the tank also lubricates the tubing 14 and sleeve 16 so as to prevent sticking.

Preferably, the tank 14 is duplicated as at 14' because it is desirable for the height of the water above the top of each sleeve 16 to be small and it is necessary to thoroughly cool the tubing. The sleeves 16 also should be short for thorough lubrication and to prevent sticking.

After passing through the sizing tanks 14, 14' the tubing is ironed down to a flat or collapsed double sheet by an assembly, designated generally by the numeral 19, which includes a series of metal rollers 20 located transversely of the tubing along two converging lines above and below the tubing.

The collapsed tubing is drawn through the collapsing rolls 20 by a pair of pulling rolls 21, 22 and fed over a guide roll 23 onto a windup roll or reel 24.

Preferably means are provided such as adjustment members 25 for adjusting the elevation of the tanks 14 and 14' so that the tanks may be positioned at the proper distance from the die nozzle D and from each other. Thus the tubing T initially engages the liquid in each tank at the appropriate temperature and conditions of size and plasticity. Generally it will be found desirable for the tubing T to initially engage the cooling and size liquid while still plastic and for the setting of the tubing to be effected by the initial liquid engagement.

Having thus described the invention, we claim:

1. Apparatus for forming tubing of thermoplastic material including an annular die, an extruder for continuously extruding heated thermoplastic material from the annular die in the form of tubing, means for introducing inflating fluid pressure medium into the tubing, an annular vessel for receiving the inflated tubing, said vessel having an outer side wall and an inner cylindrical side wall the upper edge of which is lower than the top of the outer wall, and liquid supply means responsive to the level of liquid in said vessel to maintain a liquid level therein above the upper edge of said inner cylindrical wall whereby said inner wall cooperates with the tubing responsive to the inflating medium to maintain liquid in contact with the outer surface of the tubing above the top of said inner wall, said vessel being disposed so that the tubing enters said liquid before passing through said inner wall, said means for introducing inflating medium including means for automatically controlling introduction of inflating medium into the tubing responsive to variation in the level of the cooling liquid in said vessel, and means for collapsing the tubing after the tubing passes through said vessel and for retaining the inflating medium in the uncollapsed portion of the tubing.

2. The process of forming tubing of thermoplastic material which includes extruding the plastic tubing from an annular die in tubular form, introducing a fluid pressure medium into the extruding plastic tubing to inflate the same, passing the inflated plastic tubing through a sizing ring to confine the tubing to a predetermined diameter, establishing an encircling wall of cooling liquid above the sizing ring with the internal fluid pressure medium holding the plastic tubing against the sizing ring to maintain cooling liquid above the sizing ring and thereby cool and set the inflated plastic tubing by engagement with said liquid wall, controlling introduction of fluid pressure medium into the extruding plastic tubing in relation to the height of the encircling wall of cooling liquid, and thereafter collapsing the sized and set plastic tubing.

References Cited in the file of this patent

UNITED STATES PATENTS

| | | |
|---|---|---|
| 1,601,686 | Henderson | Sept. 28, 1926 |
| 1,744,884 | Greiner | Jan. 28, 1930 |
| 2,452,080 | Stephenson | Oct. 26, 1948 |
| 2,541,064 | Irons | Feb. 13, 1951 |
| 2,583,330 | Eckert | Jan. 22, 1952 |
| 2,641,022 | Kress | June 9, 1953 |
| 2,697,852 | Bailey | Dec. 28, 1954 |
| 2,863,172 | Buteux | Dec. 9, 1958 |

FOREIGN PATENTS

| | | |
|---|---|---|
| 530,848 | Belgium | Jan. 31, 1955 |
| 741,963 | Great Britain | Dec. 14, 1955 |